(12) United States Patent
Van Hemelryck et al.

(10) Patent No.: US 8,545,617 B2
(45) Date of Patent: Oct. 1, 2013

(54) NEUTRALIZING AND CO-DISPERSION AGENT WITH STRONG CAPACITY FOR DEVELOPING COLORING POWER, AND PAINTS AND PIGMENT CONCENTRATES CONTAINING SAME

(75) Inventors: Bruno Van Hemelryck, Chaponost (FR); Christophe Ruppin, St. Pierre d' Albigny (FR)

(73) Assignee: Arkema France, Colombes Cedex (FR)

( * ) Notice: Subject to any disclaimer, the term of this patent is extended or adjusted under 35 U.S.C. 154(b) by 95 days.

(21) Appl. No.: 12/811,551

(22) PCT Filed: Dec. 19, 2008

(86) PCT No.: PCT/FR2008/052383
§ 371 (c)(1),
(2), (4) Date: Jan. 7, 2011

(87) PCT Pub. No.: WO2009/087330
PCT Pub. Date: Jul. 16, 2009

(65) Prior Publication Data
US 2012/0024193 A1 Feb. 2, 2012

(30) Foreign Application Priority Data
Jan. 4, 2008 (FR) ...................................... 08 50053

(51) Int. Cl.
*C09D 7/12* (2006.01)
*C08K 5/16* (2006.01)

(52) U.S. Cl.
USPC ...................................... 106/287.26; 106/499

(58) Field of Classification Search
None
See application file for complete search history.

(56) References Cited

U.S. PATENT DOCUMENTS

| 5,279,664 A | 1/1994 | Robinson et al. |
| 5,959,001 A * | 9/1999 | Walz et al. ..................... 523/161 |
| 6,695,900 B2 * | 2/2004 | Momose .................... 106/31.75 |

FOREIGN PATENT DOCUMENTS
EP   0 863 170   9/1998

OTHER PUBLICATIONS

Cope, A. C. et al., "Synthesis of 2-Alkylaminoethanols from Ethanolamine," The Chemical Laboratory of Bryn Mawr College, Jul. 1942, pp. 1503-1506.
International Search Report for PCT/FR2008/052383 dated Jul. 9, 2009.

* cited by examiner

*Primary Examiner* — Yun Qian
(74) *Attorney, Agent, or Firm* — Millen, White, Zelano & Branigan, P.C.

(57) ABSTRACT

The invention relates to the use, as neutralizing and/or co-dispersion agent in a paint and/or as agent for developing the coloring power of pigment(s) in a white paint base that we wish to color, of at least one hydroxylated secondary or tertiary amine.

The invention also relates to pigment concentrates and paints containing at least one hydroxylated secondary or tertiary amine.

8 Claims, No Drawings

NEUTRALIZING AND CO-DISPERSION AGENT WITH STRONG CAPACITY FOR DEVELOPING COLORING POWER, AND PAINTS AND PIGMENT CONCENTRATES CONTAINING SAME

The present invention relates to paints, whether water-based or solvent-based.

In water-based paints, such as latex paints based on acrylic, adjustment of pH is generally required in order to stabilize the latex. This adjustment is called neutralization. Moreover, when a pigment concentrate is diluted in a white paint or white base, whether water-based or solvent-based, it is also necessary to neutralize these pigment concentrates.

Moreover, the development of color in a white base always requires optimization of the desired color intensity, to keep down the cost.

The use of a polymeric primary dispersant (such as Coatex® P90 from the company Coatex or Dysperbyk® 191 or BYK® 192 from the company BYK-Chemie GmbH, or Orotan™ 850ER from the company Rohm & Haas), in order to disperse large amounts of pigments in the pigment concentrates (or pastes), may necessitate having recourse to additives with a considerable co-dispersion effect in order to reduce the amount of primary dispersant, which is generally expensive.

Certain neutralizing agents, such as, among those most commonly used, ammonia, soda, dimethylamine, monoethanolamine, diethanolamine, and N-methylethanolamine, have no effect on the color expression of organic or mineral pigments.

Another known neutralizing agent, 2-amino-2-methyl-1-propanol (CAS No. 124-68-5), marketed under the brand AMP® at 90 or 95% in water under the names AMP® 90 and AMP® 95 respectively, by the company Angus, gives an improvement in the neutralizing action, promoting the stability of the latexes or pigment concentrates by co-dispersion of the pigments, which reinforces the role of the primary dispersant.

Typically, the pH of a latex is ideally adjusted to a value between 8 and 10, preferably between 8.5 and 9.5 when the neutralizing amine (adjustment amine) is added in a proportion from 0.1 to 0.5 wt. % preferably from 0.1 to 0.3%, more preferably from 0.1 to 0.2%. In the pigment concentrates, the amount of amine co-dispersant is preferably maintained below 3.5 wt. %.

AMP® 90 therefore permits these conditions to be met, improving the neutralizing action and the reduction of the primary dispersant, but does not solve the problem of good development of color.

Thus, a first objective of the invention is to propose an agent for neutralization and co-dispersion, notably for water-based or solvent-based paints or for pigment concentrates for the preparation of said paints, displaying increased coloring power relative to the neutralizing and co-dispersion agents known to date. Other objectives will appear in the description of the invention given below.

These objectives are achieved partly or wholly as a result of the research carried out by the applicant.

Thus, the present invention firstly relates to the use, as agent for neutralization and/or co-dispersion in a paint and/or as agent for developing the coloring power of pigment(s) in a white paint base that we wish to color, of at least one hydroxylated secondary or tertiary amine of formula (1):

in which, $R^1$, $R^2$ and $R^3$, which may be identical or different, are selected from a hydrogen atom, a linear or branched alkyl radical having from 1 to 12 carbon atoms, a cycloalkyl radical having from 3 to 12 carbon atoms and a linear hydroxyalkyl radical having from 1 to 6 carbon atoms, it being understood that:
at most one of $R^1$, $R^2$ and $R^3$ represents a hydrogen atom,
at least one of $R^1$, $R^2$ and $R^3$ bears a hydroxyl group (—OH), and
at least one of $R^1$, $R^2$ and $R^3$ has at least one branching in position α ("alpha") of the nitrogen atom.

It is to be understood that, within the scope of the present invention, the cycloalkyl radical can optionally be substituted with a hydroxyl group and/or by one or more linear or branched alkyl radicals.

"Branching in position α ("alpha") of the nitrogen atom" means that the carbon atom bound directly to the nitrogen atom is in addition bound to two other carbon atoms.

"Linear hydroxyalkyl radical having from 1 to 6 carbon atoms" means a linear alkyl radical having from 1 to 6 carbon atoms, substituted in the terminal position (i.e. position ω relative to the carbon atom bound to the nitrogen atom present in the compound of formula (1)) with a hydroxyl group.

A linear hydroxyalkyl radical selected from hydroxymethyl, 2-hydroxyethyl, 3-hydroxy-n-propyl, 4-hydroxy-n-butyl, 5-hydroxy-n-pentyl and 6-hydroxy-n-hexyl is more particularly preferred, and even more preferably, the hydroxyalkyl radical is selected from hydroxymethyl, 2-hydroxyethyl and 3-hydroxy-n-propyl, the 2-hydroxyethyl radical being quite particularly preferred.

According to one embodiment, the amines of formula (1) are preferred in which $R^1$ represents a hydrogen atom and $R^2$ and $R^3$, which may be identical or different, are selected from a linear or branched alkyl radical having from 1 to 12 carbon atoms, a cycloalkyl radical having from 3 to 12 carbon atoms and a linear hydroxyalkyl radical having from 1 to 6 carbon atoms, it being understood that:
at least one of $R^2$ and $R^3$ bears a hydroxyl group (—OH), and
at least one of $R^2$ and $R^3$ has at least one branching in position α ("alpha") of the nitrogen atom.

According to another embodiment of the present invention, the amines of formula (1) are preferred in which each alkyl or cycloalkyl radical has from 3 to 10 carbon atoms, preferably from 3 to 8 carbon atoms.

According to yet another preferred embodiment of the present invention, the radical bearing a hydroxyl group has 2 or 3, more preferably 2, carbon atoms.

According to a quite particularly preferred aspect, the present invention relates to the aforementioned use of an amine of formula (1) in which:
$R^1$ represents a hydrogen atom and
$R^2$ and $R^3$, which may be identical or different, are selected from a linear or branched alkyl radical having from 3 to 8 carbon atoms, a cycloalkyl radical having from 6 to 10 carbon atoms and a linear hydroxyalkyl radical having 2 or 3, preferably 2, carbon atoms, it being understood that:
at least one of $R^2$ and $R^3$ bears a hydroxyl group (—OH), and
at least one of $R^2$ and $R^3$ has at least one branching in position α ("alpha") of the nitrogen atom.

It is preferred quite particularly to use at least one amine selected from:
N-(1-methylpropyl)-N-(2-hydroxyethyl)amine;
N-(1,3-dimethylbutyl)-N-(2-hydroxyethyl)amine;
N-(1-ethyl-3-methylpentyl)-N-(2-hydroxyethyl)amine;
N-(3,3,5-trimethylcyclohexyl)-N-(2-hydroxyethyl)amine; and
N-(4-hydroxycyclohexyl)-N-(2-hydroxyethyl)amine.

The amines of formula (1) are either available commercially, or are known, or can be obtained according to methods of synthesis known by a person skilled in the art, directly or with simple adaptations, and which are described in the scientific literature, the patent literature, in "Chemical Abstracts", or from on-line databases or from the Internet.

For example, the amines of formula (1) can easily be obtained by reductive amination of a ketone or of an aldehyde by a primary amine or a primary hydroxyalkylamine.

Thus, the present invention relates to the use, as agent for neutralization and/or co-dispersion in a paint and/or as agent for developing the coloring power of pigment(s) in a white paint base that we wish to color, of at least one amine of formula (1) as defined above.

The paint can be a water-based paint, such as a latex paint based on acrylic, or a solvent-based paint, such as an alkyd or glycerophthalic paint.

The amines of formula (1) find quite particularly interesting use in the case of pigmented paints, notably if the pigment(s) are introduced into the formulation by dilution of a pigment concentrate in a white paint base.

In fact, it was discovered, surprisingly, that the presence of at least one amine of formula (1), in the paint, or even in the pigment concentrate, or simultaneously in the paint base called "white base" and in the pigment concentrate, permits a substantial increase in the coloring power (color expression) of said pigment or pigments.

In other words, the presence of at least one amine of formula (1) in the paint, the white base and/or in the pigment concentrate can make it possible to reduce the amount of pigments that would have been necessary to obtain the same coloring power in said paint or in said pigment concentrate not containing amine of formula (1).

The present invention also relates to a pigment concentrate comprising at least one amine of formula (1) as defined above. The pigment concentrate of the invention generally comprises in addition a primary dispersant, one or more pigments, water and one or more usual additives and auxiliaries.

The pigment concentrate of the invention can advantageously be intended for coloring a water-based or solvent-based white paint base.

The pigment concentrate can also comprise one or more other neutralizing agents, notably selected from those usually employed and known by a person skilled in the art, and notably those selected from ammonia, sodium hydroxide, dimethylamine, monoethanolamine, diethanolamine, N-methylethanolamine, 2-amino-2-methyl-1-propanol, and 2-n-butylaminoethanol.

Said pigment concentrate can advantageously comprise from 0.05 to 10 wt. % of at least one amine of formula (1), and, when it is/they are used mixed with at least one other neutralizing agent, it/they advantageously represent(s) at least 1 wt. %, preferably at least 50 wt. % of said mixture (all of the neutralizing agents).

Another advantage connected with the use of at least one amine of formula (1) in the pigment concentrate resides in the fact that it is possible to adjust the amount of primary dispersant included in the formulation of the pigment concentrate, taking into account the dispersant role of the amine or amines of formula (1) defined previously.

Moreover, the amount of pigment concentrate that is to color the white paint can also be adjusted advantageously, taking into account the capacity for promoting increased development of the coloring power of the amine or amines of formula (1) defined previously.

According to another aspect, the present invention also relates to a water-based or solvent-based paint characterized in that it comprises at least one amine of formula (1) as defined previously as neutralizing agent and/or co-dispersion agent in the paint and/or as agent for developing the coloring power of pigment(s).

The water-based or solvent-based paints, colored or not, according to the present invention find quite particularly advantageous application as products for coating surfaces, walls and other architectural surfaces, whether interior or exterior.

Advantageously, the paint according to the invention can contain from 0.05 to 2 wt. %, preferably 0.1 to 0.5 wt. %, and even more preferably 0.1 to 0.2 wt. % of at least one amine of formula (1).

The amine or amines of formula (1) can be the only neutralizing agent(s) in the paint formulation or alternatively the paint can comprise at least one other neutralizing agent selected from those usually employed and known by a person skilled in the art, and notably from ammonia, sodium hydroxide, dimethylamine, monoethanolamine, diethanolamine, N-methylethanolamine, 2-amino-2-methyl-1-propanol, and 2-n-butylaminoethanol.

Preferably, the amine(s) of formula (1) represent(s) at least 1% of the mixture of neutralizing agents, even more preferably at least 50 wt. % of the mixture of neutralizing agents.

The present invention also relates to a colored paint, characterized in that it was obtained by dilution of a pigment concentrate (CP1) comprising per 100 parts by weight:
from 1 to 4 parts by weight of at least one amine of formula (1) as defined above;
from 20 to 50 parts by weight of at least one pigment or dye;
from 40 to 70 parts by weight of water;
from 1 to 10 parts by weight of a drying retarder, such as polyethylene glycol 200; and
from 0.1 to 0.8 parts by weight of the usual additives and auxiliaries, such as antifoaming agent and biocide;
in a base of matt white water-based paint (PM1) comprising per 1000 parts by weight:
from 80 to 150 parts by weight of added water;
from 1 to 2 parts by weight of at least one dispersant;
from 1 to 3 parts by weight of at least one neutralizing agent;
from 80 to 150 parts by weight of white pigment, for example titanium dioxide ($TiO_2$);
from 400 to 550 parts by weight of at least one other white pigment;
from 100 to 200 parts by weight of at least one binder such as an acrylic emulsion, an acrylic resin;
from 150 to 250 parts by weight of at least one thickener such as a cellulose ether; and
from 2 to 5 parts by weight of the usual additives and auxiliaries, such as antifoaming agent, coalescing agent and biocide.

According to another aspect, the present invention also relates to a colored paint, characterized in that it was obtained by dilution of the pigment concentrate (CP1) defined above in a water-based satin-finish white paint (PS1) comprising per 1000 parts by weight:
- from 70 to 150 parts by weight of added water;
- from 1 to 3 parts by weight of at least one dispersant;
- from 1 to 2 parts by weight of at least one neutralizing agent;
- from 80 to 300 parts by weight of white pigment, for example titanium dioxide ($TiO_2$);
- from 40 to 90 parts by weight of at least one other white pigment;
- from 400 to 550 parts by weight of at least one binder such as an acrylic emulsion, an acrylic resin;
- from 4 to 20 parts by weight of at least one thickener; and
- from 10 to 40 parts by weight of the usual additives and auxiliaries, such as antifoaming agent, coalescing agent and biocide.

According to yet another aspect, the present invention also relates to a colored paint, characterized in that it was obtained by dilution of the pigment concentrate (CP1) defined above in a water-based white exterior wall paint (PF1) comprising per 1000 parts by weight:
- from 80 to 150 parts by weight of added water;
- from 200 to 250 parts by weight of at least one binder such as an acrylic resin;
- from 1 to 3 parts by weight of at least one dispersant;
- from 1 to 3 parts by weight of at least one neutralizing agent;
- from 160 to 250 parts by weight of white pigment, for example titanium dioxide ($TiO_2$);
- from 300 to 400 parts by weight of at least one other white pigment;
- from 120 to 200 parts by weight of at least one thickener such as a cellulose ether; and
- from 2 to 5 parts by weight of the usual additives and auxiliaries, such as antifoaming agent and biocide.

According to yet another aspect, the present invention also relates to a colored paint, characterized in that it was obtained by dilution of the pigment concentrate (CP1) defined above in a base of solvent-based white paint ($P_{Solv}$), comprising per 1000 parts by weight:
- from 500 to 650 parts by weight of an alkyd resin;
- from 230 to 350 parts by weight of at least one white pigment;
- from 4 to 8 parts by weight of at least one wetting agent;
- from 15 to 25 parts by weight of at least one drying agent;
- from 6 to 10 parts by weight of the usual additives and auxiliaries, such as antisettling agents and antiskinning agents; and
- from 80 to 120 parts by weight of a hydrocarbon solvent, for example white spirit.

In each of the paints described above, the pigment concentrate generally represents between 0.1 and 8 wt. % of the resultant paint.

The use of at least one amine of formula (1) as described above in a pigment concentrate, or a water-based or solvent-based paint, makes it possible to demonstrate one or more of the following characteristics:

(1) when AMP® 90, used in a neutralizing agent and/or co-dispersion agent in water-based paints, at a content in a latex from 0.1 to 0.5% and preferably 0.1 to 0.2%, for adjustment of ideal pH between 8 and 10, preferably between 8.5 and 9.5, is replaced weight for weight with at least one amine of formula (1), the coloring power is higher, with a ΔE* of at least one unit of relative difference with reference to AMP®-90 (AMP®-90 in the pigment concentrate and the white base);

(2) owing to its greater capacity for developing the coloring power, an amine of formula (1) can make it possible not only to reduce the amount of primary dispersant by a factor of at least 4 in the pigment concentrate but also to reduce, by at least 10%, the amount of pigment concentrate for coloring a water-based white base;

(3) replacement of AMP® 90 with at least one amine of formula (1) is not limited to application to paints of the latex type, but can also be applied to paints of the alkyd type, while offering better dispersant power and better capacity for developing the coloring power;

(4) replacement of AMP® 90 with at least one amine of formula (1) does not exclude the combined usage of one or more other neutralizing agents as defined previously, including AMP®90 itself, though with a minimal proportion of the amine(s) of formula (1) (at least 1%) to obtain the advantages described;

(5) the phenomenon is notably observed for pigments that are known to be difficult to disperse, such as phthalocyanine blue.

The following examples illustrate the present invention but without limiting its scope. In these examples, the parts and the percentages are by weight, unless stated otherwise.

EXAMPLE OF PREPARATION A

Preparation of the Pigment Concentrates

Using the methods known by a person skilled in the art, three (3) different pigment concentrates (CP) are prepared, having the formulations shown in Table 1 below and designated $CP_{AM}$, $CP_{AD}$ and $CP_{SB}$, of blue color (phthalocyanine blue pigment).

TABLE 1

Formulation of the pigment concentrates
(amounts stated in parts in weight)

| Constituents | | $CP_{AM}$ | $CP_{AD}$ | $CP_{SB}$ |
|---|---|---|---|---|
| Water | | 62.97 | 62.97 | 62.97 |
| Neutralizing agent | 2-amino-2-methyl-1-propanol[1] | 2.1 | — | — |
| | 2-n-butylaminoethanol[2] | — | 2.1 | — |
| | N-(1-methylpropyl)-N-(2-hydroxyethyl)amine[3] | — | — | 2.1 |
| Primary dispersant[4] | | 2.1 | 2.1 | 2.1 |
| Blue pigment[5] | | 27.98 | 27.98 | 27.98 |
| Antifoaming agent[6] | | 0.35 | 0.35 | 0.35 |
| Biocide[7] | | 0.07 | 0.07 | 0.07 |
| Drying retarder polyethylene glycol 200 | | 2.83 | 2.83 | 2.83 |
| Thickener[8] | | 1.6 | 1.6 | 1.6 |

[1]Neutralizing agent marketed by the company "ANGUS" under the brand "AMP ® 90" (CAS No. 124-68-5) not possessing branching on either of the α carbon atoms of the nitrogen (comparative example). This neutralizing agent is introduced in the formulation in the 90% form in water, this amount of water not being counted in the 47 parts by weight of added water of the formulation;
[2]Neutralizing agent not possessing branching on either of the α carbon atoms of the nitrogen (comparative example) (CAS No. 111-75-1);
[3]Neutralizing agent of formula (1) according to the invention (CAS No. 35265-04-4);
[4]Primary dispersant marketed by the company "BYK-CHEMIE" under the brand "DISPERBYK 191";
[5]Phthalo blue 15:2 pigment, such as that marketed by the company "CLARIANT" under the name "BLEU BT 627 D"
[6]Antifoaming agent marketed by the company "CIBA SPECIALTY CHEMICALS" under the name "EFKA 2526";
[7]Biocide marketed by the company "THOR" under the name "ACTICIDE MBS";
[8]Thickener marketed by the company "DEGUSSA" under the name "VISCOPLUS 3030 10%" at 50% in water.

Pigment concentrate $CP_{AM}$ is obtained with a large amount of foam and a grainy appearance. Pigment concentrate $CP_{AD}$ also has a small amount of foam. In contrast, pigment concentrate $CP_{SB}$ (according to the invention) has a good appearance, without any foaming.

To prepare each of these pigment concentrates, the pigment was ground in a ball mill with balls of diameter 1.5 mm, in the presence of water, primary dispersant, neutralizing agent, antifoaming agent, at 1000 rev/min for 1.5 h. The particle size is checked using a North gauge and selected at 10 μm. The biocide, the drying retarder PEG200 and the optional thickener are added at the end of the grinding time.

EXAMPLE OF PREPARATION B

Preparation of White Bases of Matt Paints

Three white paint bases BBP1, BBP2 and BBP3 are prepared, each of 952 g. Each constituent of the paint is introduced in controlled proportions. The paint compositions are presented in Table 2 below:

TABLE 2

| Constituents | Parts by weight |
|---|---|
| Added water | 110 |
| Antifoaming agent marketed under the name "Tego Foamex 7447" by the company Tego Chemie | 2 |
| Polyacrylate dispersant marketed under the name "Coatex P90" by the company Coatex | 2 |
| Neutralizing agent: For BBP1: marketed under the brand "AMP ® 90" by the company Angus, comprising a 90% solution in water of 2-amino-2-methyl-1-propanol (comparative example; CAS No. 124-68-5) For BBP2: 2-n-butylaminoethanol (comparative example; CAS No. 111-75-1) For BBP3: N-(1-methylpropyl)-N-(2-hydroxyethyl)amine according to the invention (CAS No. 35265-04-4) | 2 |
| Biocide marketed by the company Thor under the name "Acticide MBS" | 1 |
| White pigment marketed under the name "Tiona 595" by the company Millenium | 90 |
| Talc with average particle size of 20 μm, marketed by the company "TALC LUZENAC" | 60 |
| Calcium carbonate marketed under the name "MIKHART 2" by the company "PROVENCALE" | 160 |
| Calcium carbonate marketed under the name "MIKHART 5" by the company "PROVENCALE" | 250 |
| Binder based on acrylic resin marketed under the name "Craymul 2132" by the company Cray Valley | 100 |
| Coalescing agent marketed under the name "Texanol" by the company Eastman | 5 |
| Cellulosic thickener marketed under the name "Natrosol 330PA 2%" by the company Hercules/Aqualon | 170 |
| Total | 952 |

The three white bases BBP1 (with neutralizing agent AMP® 90), BBP2 (with neutralizing agent 2-n-butylaminoethanol) and BBP3 (with neutralizing agent N-(1-methylpropyl)-N-(2-hydroxyethyl)amine according to the invention) are prepared by mixing the various constituents presented in Table 2 above, in the stated proportions, according to the techniques known by a person skilled in the art for the formulation of latexes.

The water, the antifoaming agent, the dispersant, the neutralizing agent and the antibacterial agent are mixed first at 500 rev/min in a disperser for 5 minutes. A fluid mixture is obtained.

Then "paste mixing" is carried out (stage in which the fillers are introduced), adding the pigments and modifiers of rheology and gloss (titanium dioxide, calcium carbonate and talc) to the mixture obtained previously, stirring at 800 rev/min for 20 minutes. The fillers are introduced slowly, and a temperature rise of the mixture is often observed as a result of the shearing forces.

The stirring is then reduced to 500 rev/min for adding the resin and the coalescing agent. The viscosity is then optionally adjusted by adding a thickener (type PU, cellulosic, or polyether). If the paint is too thick, it is possible to add water. As a general rule, the viscosity must be about 4000 to 5000 mPa·s. Following viscosity adjustment, the whole is stirred at 500 rev/min for 5 minutes.

Storage Stability of the White Bases:

Measurements of pH and viscosity (Brookfield, Spindle 6, 100 rev/min, room temperature) are taken at least 24 h after formulation, as the thickener can still be active for some time after the end of formulation. The pH values are equivalent for the 3 formulations, and are between 9.2 and 9.3.

After 15 days in the stove at 40° C., which corresponds to aging of about 6 months, there is little decrease in pH, and the formulations are therefore regarded as stable.

EXAMPLES OF THE INVENTION AND COMPARATIVE EXAMPLES

General Procedure

The white bases BBP1 to BBP3 are colored by diluting the pigment concentrates $CP_{AM}$, $CP_{AD}$ and $CP_{SB}$, prepared in example of preparation A, in the white paint bases from example of preparation B, according to the mixing schemes shown in Table 3 below.

TABLE 3

Mixing (dilution) schemes

| Example | White Paint Base (parts by weight) | Pigment Concentrate (parts by weight) | Color of the paint obtained |
|---|---|---|---|
| 1 (comparative) | BBP1 (100) | $CP_{AM}$ (4) | Blue |
| 2 (comparative) | BBP2 (100) | $CP_{AD}$ (4) | Blue |
| 3 (invention) | BBP3 (100) | $CP_{SB}$ (4) | Blue |

Tests of Opacity, Gloss and Coloring Power on Dry Films:

Opacity means the covering power of a paint. The opacity, measured using a Dr. Lange spectrophotometer and according to the manufacturer's instructions, is entirely acceptable for each of the formulations and, in each case, is above 95%.

Gloss denotes the capacity of a surface to reflect light without diffusing it. No difference was observed between the different formulations, whose gloss at 60° is less than 10, as measured on the Trio™ instrument from Novo Glass.

The coloring power (development of color) is evaluated on the basis of phthalocyanine blue pigment concentrates, added to each of the paint formulations. The tests carried out here demonstrate the dispersing power of each of the neutralizing agents stated above.

In each case, color development is evaluated in the following experimental conditions:

The color development of a colored white base is evaluated by wet deposition under 200 μm on LENETA 2A standard contrast cards (The LENETA COMPANY, USA).

After drying for 24 hours, these contrast cards are examined visually and measured using a Dr. Lange spectrophotometer.

The color measurements are carried out on a Dr. Lange spectrophotometer, in included specular mode, measurement in reflection, measurement aperture 8 mm, UV emission 100%, Luminance d/8 (Diffusion at 8° relative to the illumination axis).

The values are the mean of three measurements taken on the contrast cards. The values of L*, a*, b* and ΔE* shown in Table 4 below are the color space coordinates according to CIELAB and are described in standard DIN 6174 and are explained in "BASF Handbook on Basics of Coating Technology" of the authors Goldschmidt and Streitberger from Editions Vincents, published in 2003, pages 360 to 372. It will be recalled that:

L* represents the white index between 0 (black) and 100 (white);

a* represents the red index between −100 (green) and +100 (red);

b* represents the yellow index between −100 (blue) and +100 (yellow).

The value of E* is calculated from the equation: $E^* = \sqrt{a^{*2}+b^{*2}+L^{*2}}$.

Table 3 given above presents three (3) examples (1 illustrating the present invention, and two comparative) of paints colored blue, which were submitted to the color measurements described above; the results of these measurements (spectrophotometric values) are presented in Table 4 below.

TABLE 4

Results of measurement of color development of the paints

| Example | L* | a* | b* | |
|---|---|---|---|---|
| 1 | 60.99 | −14.54 | −31.16 | |
| | ΔL* (relative to Ex. 1) | Δa* (relative to Ex. 1) | Δb* (relative to Ex. 1) | ΔE* (relative to Ex. 1) |
| 2 | −0.75 | −0.69 | −2.10 | 2.33 |
| 3 | −1.19 | −0.67 | −2.09 | 2.50 |

It can be seen from Table 4 that the formulations in Examples 2 and 3 display greater development of coloring power than the formulation in Example 1.

Moreover, the ΔE* of Example 3 is greater than that of Example 2, thus indicating better color development. This is corroborated by visual observation of the films. The films prepared from the formulation in Example 3 are more homogeneous than those prepared from the formulation in Example 1, but also than those prepared from the formulation in Example 2, in which the presence of grains and darker blue traces can be observed.

The invention claimed is:

1. A pigment concentrate comprising:
   at least one amine selected from:
   N-(1-methylpropyl)-N-(2-hydroxyethyl)amine;
   N-(1,3-dimethylbutyl)-N-(2-hydroxyethyl)amine;
   N-(1-ethyl-3-methylpentyl)-N-(2-hydroxyethyl)amine;
   N-(3,3,5-trimethylcyclohexyl)-N-(2-hydroxyethyl)amine; and
   N-(4-hydroxycyclohexyl)-N-(2-hydroxyethyl)amine;
   a primary dispersant;
   one or more pigments;
   water; and
   one or more additives or auxiliaries.

2. The pigment concentrate as claimed in claim 1, comprising 0.05 to 10 wt. % of the at least one amine.

3. The pigment concentrate as claimed in claim 1, further comprising one or more other neutralizing agents, selected from ammonia, sodium hydroxide, dimethylamine, monoethanolamine, diethanolamine, N-methylethanolamine, 2-amino-2-methyl-1-propanol, and 2-n-butylaminoethanol,
   wherein the amount of the at least one amine selected from:
   N-(1-methylpropyl)-N-(2-hydroxyethyl)amine;
   N-(1,3-dimethylbutyl)-N-(2-hydroxyethyl)amine;
   N-(1-ethyl-3-methylpentyl)-N-(2-hydroxyethyl)amine;
   N-(3,3,5-trimethylcyclohexyl)-N-(2-hydroxyethyl) amine; and
   N-(4-hydroxycyclohexyl)-N-(2-hydroxyethyl)amine;
   represents at least 1 wt. % of all neutralizing agents.

4. The pigment concentrate of claim 3, wherein the amount of the at least one amine selected from:
   N-(1-methylpropyl)-N-(2-hydroxyethyl)amine;
   N-(1,3-dimethylbutyl)-N-(2-hydroxyethyl)amine;
   N-(1-ethyl-3-methylpentyl)-N-(2-hydroxyethyl)amine;
   N-(3,3,5-trimethylcyclohexyl)-N-(2-hydroxyethyl)amine; and
   N-(4-hydroxycyclohexyl)-N-(2-hydroxyethyl)amine;
   represents at least 50 wt. % of all neutralizing agents.

5. The pigment concentrate of claim 3, wherein the primary dispersant is a polymeric primary dispersant.

6. A method for neutralizing and/or co-dispersing a paint and/or for developing the coloring power of pigment(s) in a white paint base that is to be colored, comprising providing in the paint or the white paint base a pigment concentrate according to claim 1.

7. The method as claimed in claim 6, wherein the paint or the white paint base is a water-based or solvent-based pigmented paint.

8. The method as claimed in claim 6, which is for developing the coloring power of pigment(s) in the white paint base that is to be colored wherein the pigment concentrate is added to the white paint base.

* * * * *